(12) United States Patent
Gu

(10) Patent No.: US 7,577,551 B2
(45) Date of Patent: Aug. 18, 2009

(54) METHOD, PRODUCT AND DEVICE FOR CODING EVENT HISTORY

(75) Inventor: Fangming Gu, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 393 days.

(21) Appl. No.: 11/448,940

(22) Filed: Jun. 7, 2006

(65) Prior Publication Data
US 2007/0288203 A1 Dec. 13, 2007

(51) Int. Cl.
G01R 13/00 (2006.01)

(52) U.S. Cl. ............... 702/187; 702/67; 702/70; 702/79

(58) Field of Classification Search ............ 702/57, 702/66, 67, 68, 70, 79, 176, 177, 178, 187
See application file for complete search history.

(56) References Cited

U.S. PATENT DOCUMENTS

| 3,898,689 | A | * | 8/1975 | D'Orazio et al. | ............... 360/40 |
|---|---|---|---|---|---|
| 4,087,752 | A | * | 5/1978 | Melvin | ............... 375/332 |
| 6,055,468 | A | * | 4/2000 | Kaman et al. | ............... 701/29 |
| 6,128,560 | A | * | 10/2000 | Ishii | ............... 701/29 |
| 6,374,388 | B1 | * | 4/2002 | Hinch | ............... 714/799 |
| 6,922,665 | B1 | * | 7/2005 | Guccione et al. | ............... 703/14 |
| 7,069,185 | B1 | * | 6/2006 | Wilson et al. | ............... 702/188 |
| 2004/0095350 | A1 | * | 5/2004 | Kamiyama | ............... 345/441 |
| 2004/0260435 | A1 | * | 12/2004 | Jung et al. | ............... 701/29 |
| 2007/0032977 | A1 | * | 2/2007 | Kaval et al. | ............... 702/124 |

* cited by examiner

Primary Examiner—Jeffrey R West

(57) ABSTRACT

A method for coding an event history is disclosed. Information relating to a real time state of an event is received. For a defined interval of time, it is determined whether the state of the event is in one of two states. In response to the event being in a first state, a data stream is appended with a first characteristic representative of the first state, and in response to the event being in a second different state, the data stream is appended with a second characteristic representative of the second state. The appended data stream is saved, and the process repeated for the next sequential defined interval of time.

17 Claims, 3 Drawing Sheets

METHOD, PRODUCT AND DEVICE FOR CODING EVENT HISTORY

BACKGROUND OF THE INVENTION

The present disclosure relates generally to event history coding, and particularly to time-stamped two-state event history coding.

Production equipment and processes often experience On and Off cycles that may impact the planning of equipment maintenance schedules, or the planning for efficient equipment utilization. In an effort to minimize the operation/support cost associated with related systems, either the occurrence time of different events may be monitored, or the cumulative time duration between events may be monitored. However, both of these monitoring schemes requires storage of a vast amount of time-sensitive data, which may also impact bandwidth requirements for data transmission, post-processing time requirements, and post-acquisition data storage size for archiving.

Accordingly, there remains a need in the art for an event history coding scheme that overcomes these drawbacks.

BRIEF DESCRIPTION OF THE INVENTION

An embodiment of the invention includes a method for coding an event history. Information relating to a real time state of an event is received. For a defined interval of time, it is determined whether the state of the event is in one of two states. In response to the event being in a first state, a data stream is appended with a first characteristic representative of the first state, and in response to the event being in a second different state, the data stream is appended with a second characteristic representative of the second state. The appended data stream is saved, and the process repeated for the next sequential defined interval of time.

Another embodiment of the invention includes a device for coding an event history. The device includes a receiver for receiving information relating to a real time state of an event, a logic device for determining, for a defined interval of time, whether the state of the event is in one of two states; a processor for appending a data stream, in response to the event being in a first state, with a first character representative of the first state, and for appending the data stream, in response to the event being in a second different state, with a second character representative of the second state, and a storage device for saving the appended data stream. The logic device and processor are configured to repeat the determining and appending processes for the next sequential defined interval of time.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a data reduction method for archival, retrieval, and transmission of a time-stamped two-state event history. In an embodiment, the time-stamped event may be associated with the "in use" state of a piece of equipment, such as forklift, machinery or production line equipment, for example, or may be associated with the "in process" state of an operation, such as a plating process or a painting process, for example. It is contemplated that the time-stamped event history data coding, as disclosed herein, will enable improved preventative maintenance scheduling, and improved equipment utilization rates. Transmission of the data via a wireless network (paid or otherwise) is contemplated to have a significant impact on the operation and/or support cost of a related system.

Instead of directly recording the occurrence time of events, or cumulative time duration between events, an embodiment of the invention records the states of the event as a series of logical "0" and "1" values (binary characters), which may be recorded at a predefined time interval or a configurable time interval, the configurable time interval being chosen to meet a desired data resolution. In an embodiment, the time interval for the assignment of a logical value is one minute. However, the time interval is not limited to one minute, and may be one second, several minutes or any time duration meeting time resolution requirement for the purposes disclosed herein. Viewed another way, the time interval defines the time resolution for capturing the two-state data relating to the equipment or process under study. By using the logical values, each data point may be stored using only one data bit per state per defined interval of time. Furthermore, additional traditional lossless data compression technique may be used on the data stream to provide additional data reduction.

Figure 1:
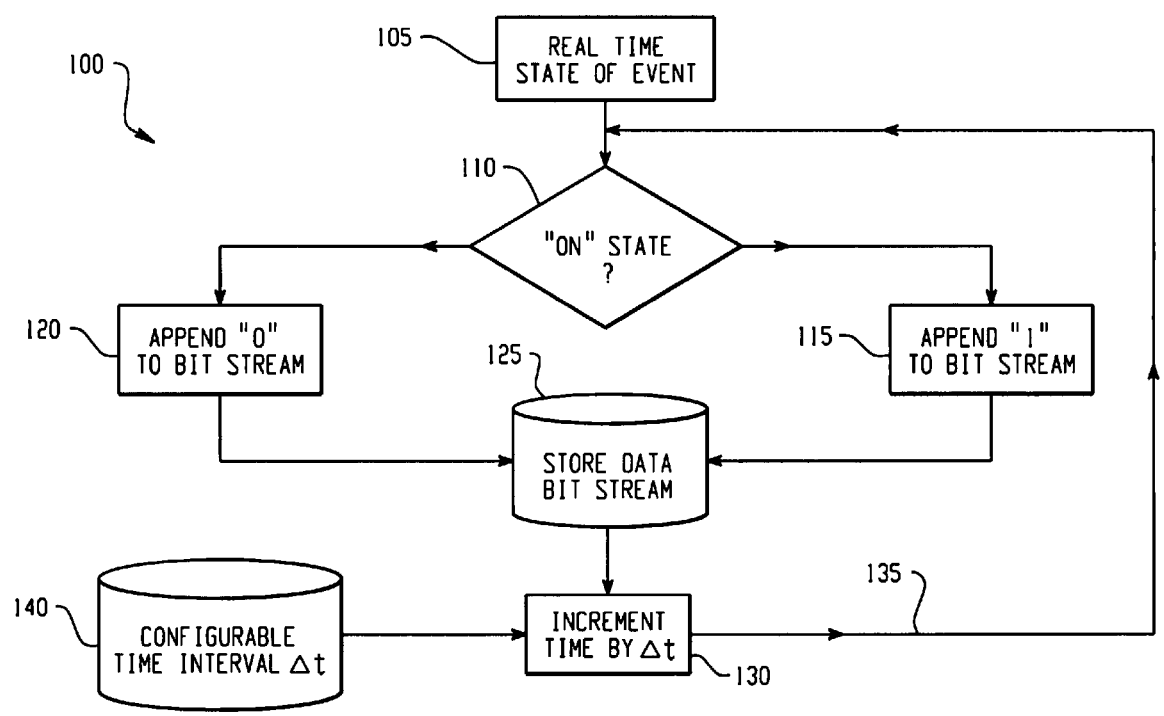
FIG. 1 illustrates a flowchart of an exemplary method for coding an event history in accordance with embodiment of the invention.

FIG. 1 illustrates a flowchart of an exemplary method 100 for coding an event history in accordance with embodiment of the invention. At box 105, information relating to a real time state of an event is received. As discussed above, the event may be the operation of a piece of equipment for example. At box 110, it is determined, for a defined interval of time$\Delta t$, which may be configurable, whether the state of the event is in one of two states, such as "On" or "Off" for example. If the state is "On", then logic passes to box 115, where a logical value of "1" is appended to a bit stream, which is representative of the "On" state for the associated interval of time $\Delta t$. If the state is "Off", then logic passes to box 120, where a logical value of "0" is appended to the bit stream, which is representative of the "Off" state for the associated interval of time $\Delta t$. At box 125, the appended data bit stream is stored in a memory for subsequent transmission, analysis, and archiving.

While an embodiment has been described having the first state being "On" and the second state being "Off", it will be appreciated that the scope of the invention is not so limited, and that the invention is also contemplated to encompass a first state being "High" and a second state being "Low", for example. Accordingly, the "On" state may be viewed more broadly as a "first" state, and the "Off" state may be viewed more broadly as a "second" state.

Also while an embodiment has been described having a first logical value being "1" and a second logical value being "0", it will be appreciated that the scope of the invention is not so limited, and that the invention is also contemplated to encompass a first logical value being an optically recognized first signal (light "On" for example), and a second logical value being an optically recognized second signal (light "Off" for example). Accordingly, the logical "1" value may be viewed more broadly as a "first" characteristic, and the logical "0" value may be viewed more broadly as a "second" characteristic.

At box 130, the time is incremented by Δt, and the determining and appending process is repeated 135 for the next sequential interval of time.

At box 140, the interval of time Δt is optionally defined or selected by a user, thereby enabling Δt to be configurable.

Figure 2:
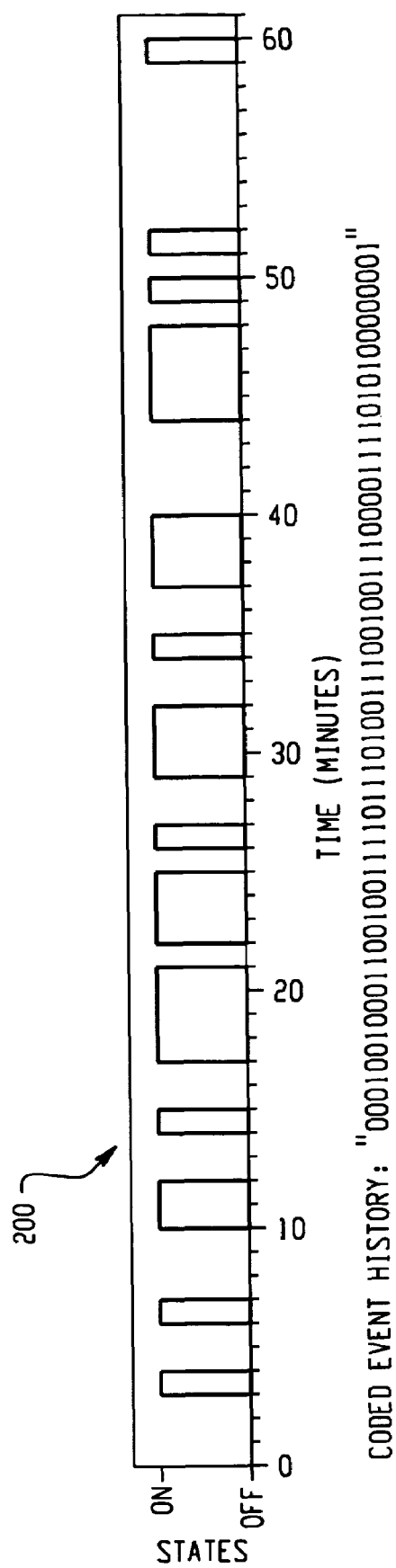
FIG. 2 depicts an appended bit stream having "0" and "1" binary values in accordance with an embodiment of the invention.

Referring now to FIG. 2, an appended bit stream 200 having "0" and "1" binary values is illustrated for a 60-minute time duration with a 1-minute time interval Δt. In an exemplary embodiment, the appended bit stream 200 represents the "On" and "Off" cycling of a piece of production machinery, and the time duration for the coded event history is one hour, or 60 minutes. However, the time duration is not limited to one hour, and may be one work-shift, one day, one week, or any time duration suitable for the purposes disclosed herein. As illustrated, the appended bit stream would be represented as the binary data stream:

"000100100011001001111011101001110010011100001111010100000001", which can be stored in eight bytes of memory or less.

Figure 3:
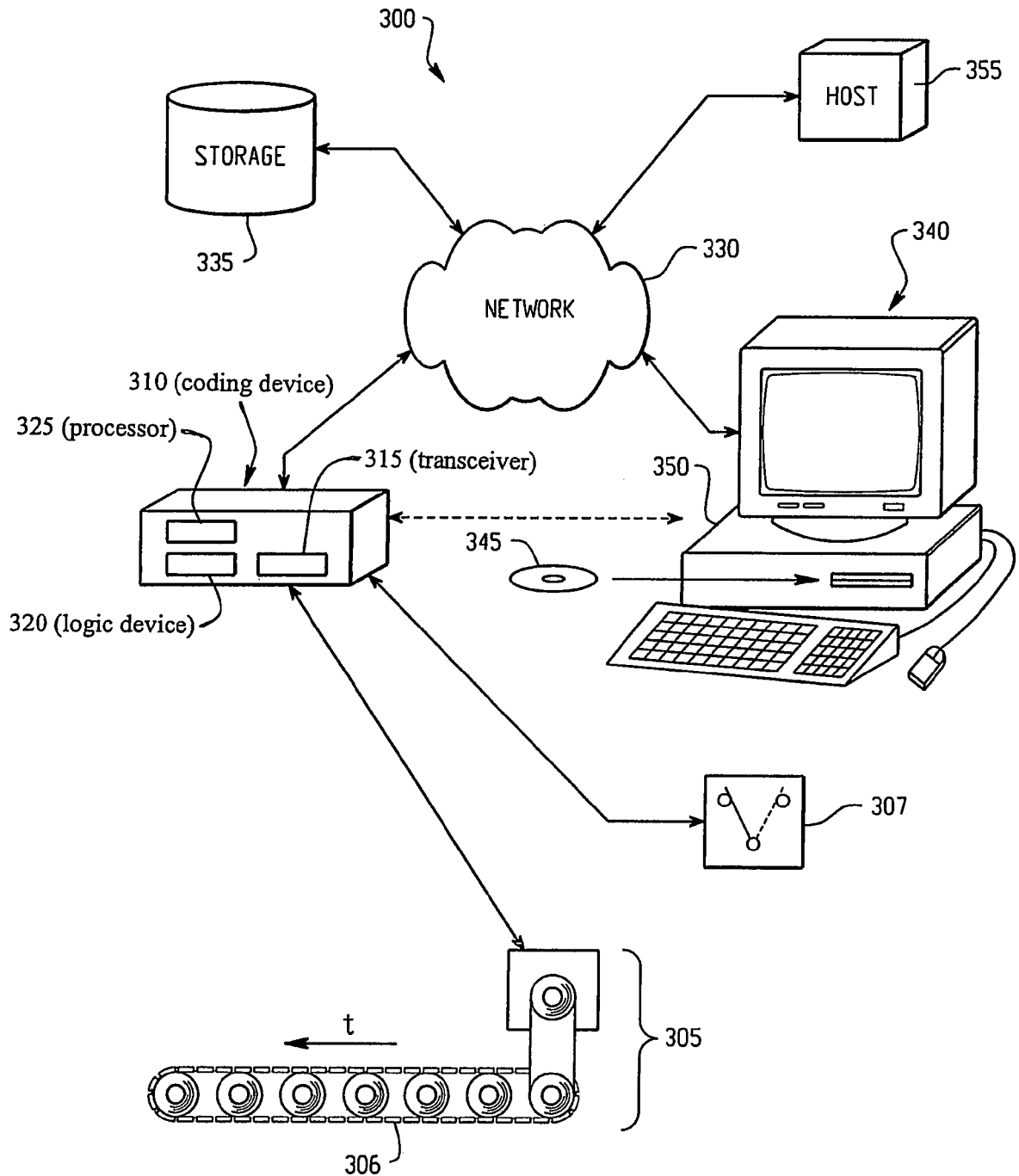
FIG. 3 depicts a system for implementing the method illustrated in FIG. 1.

Referring now to FIG. 3, a system 300 for implementing the method 100 is illustrated. Equipment 305 having a conveyer belt 306 operating in real time "t" is in signal communication with a coding device 310 via a transceiver (transmitter and receiver) 315, which receives information relating to the real time state of an event at equipment 305, such as "On" and "Off", "Fast" and "Slow", or "High" and "Low", for example. While equipment 305 is illustrated herein as stationary equipment, conveyer belt for example, it will be appreciated that the scope of the invention is not so limited, and that the scope also encompasses non-stationary equipment, such as a forklift truck for example, where the two states of the forklift truck may be "in use" and "not in use" for example. Other equipment that may be in communication with device 310, such as a switch or a valve, is represented by reference numeral 307. The two states of a switch may be "On" and "Off", and the two states of a valve may be "Open" and "Closed". Device 310 includes a logic device 320 for determining, for a defined interval of time Δt, whether the state of the event is in the one of two states ("On" or "Off" for example). Device 310 also includes a processor 325 for appending a data stream, in response to the event being in a first state, with a first character (logical "1" for example) representative of the first state, and for appending the data stream, in response to the event being in a second different state, with a second character (logical "0" for example) representative of the second state. In an embodiment, device 310 is in signal communication with a network 330, which in turn is in signal communication with a storage facility 335 for saving the appended data stream from device 310. Device 310, via logic device 320 and processor 325, repeats the aforementioned determining and appending method steps for the next sequential defined interval of time. The repeating of the method steps may be terminated on command, at a predetermined time, or when a pre-defined amount of data has been accumulated.

As will be appreciated from the foregoing, the two states of an event are not limited to just "On" and "Off". As such, the scope of the invention is intended to encompass all events that can be monitored and analyzed via two states, of any type. For example, a plating or painting process may be monitored from the standpoint of a "Yes" and "No" point of view, or from an "Active" and "Inactive" point of view.

Device 310 may be in direct signal communication with the network 330, or may be in indirect signal communication with the network 330 via a computer 340. In an embodiment, computer 340 is responsive to a computer program product 345 (such as a CD-ROM for example) for coding an event history, the product 345 comprising a storage medium, readable by a processing circuit 350, storing instructions for execution by the processing circuit 350 for implementing the method 100 depicted in FIG. 1 and discussed above. Computer 340 may also contain, or be responsive to, executable instructions for performing post-processing of the stored and transmitted bit stream data, thereby enabling the appended data stream to be remotely analyzed and archived. The bit stream data may be communicated amongst and between the various devices of system 300 using any means suitable for the purposes disclosed herein, including but not limited to ethernet communication and wireless communication, including electromagnetic and optical communication.

In alternative embodiments, the bit stream data may be communicated in real time, or may be communicated after a defined duration of time, such as at the completion of a production cycle or a production shift for example. In the case of subsequent communication and analysis, storage device 335 may be utilized for storing the bit stream data, which is subsequently communicated to computer 340 for analysis.

In an alternative embodiment, the instructions for implementing the method 100 may be located and performed on a host computer 355, which is in signal communication with device 310 via the network 330.

While only a few communication schemes have been described above, it will be appreciated that the scope of the invention is not so limited, and that the invention is intended to encompass any communication scheme, hardwire or otherwise, that may be accomplished between the equipment 305, device 310, network 330, storage 335, computer 340, and host 355.

While certain combinations of devices 305, 310, 330, 335, 340 and 355 have been described herein, it will be appreciated that these certain combinations are for illustration purposes only and that any combination of any of the aforementioned devices may be employed in accordance with an embodiment of the invention. Any and all such combinations are contemplated herein and are considered within the scope of the invention disclosed.

While an embodiment of the invention has been described employing a network 330 and remote devices 335, 340 and 355, it will be appreciated that the scope of the invention is not so limited, and that the invention also applies to a device 310 having the functionality of any one or all of devices 335, 340 and 355 embedded therein, thereby enabling device 310 to locally provide the analysis and archiving utilities.

While an embodiment of the invention has been disclosed relating to collected data that is compressed via two-state coding, it will be appreciated that the scope of the invention is not so limited and that the conversion and compression of existing data via two-state coding is also within the scope of the invention.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), and erasable programmable read only memory (EPROM) for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to code a time-stamped two-state event history.

As disclosed, some embodiments of the invention may include some of the following advantages: the ability to store a two-state event history using only a single data bit per state per defined interval of time; the ability to store a two-state event history having a 60-minute duration with a 1-minute state time interval in 8-bytes or less; the ability to configure the time interval to be applied to the bit stream data of the two-state event history; and, compact data storage, or increased data content for the same size data storage.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for coding an event history, comprising:
receiving information relating to a real time state of an event;
determining, with a logic device, for a defined interval of time, whether the real time state of the event is in one of two states;
in response to the event being in a first state, appending, with a processor, a data stream with a first characteristic representative of the first state, and in response to the event being in a second different state, appending the data stream with a second characteristic representative of the second state;
saving the appended data stream;
repeating the determining and appending for a next sequential defined interval of time; and
communicating the appended data stream for analysis.

2. The method of claim 1, wherein:
the two states are on and off.

3. The method of claim 1, wherein:
the first state is on, and the second state is off.

4. The method of claim 1, wherein:
the first character is a binary one, and the second character is a binary zero, thereby enabling a two-state event history to be established using only one bit per state per defined interval of time.

5. The method of claim 1, wherein:
the defined interval of time is one minute.

6. The method of claim 5, wherein:
a time-stamped two-state event history for a total duration of 60 minutes is capable of being represented by a binary string storable in 8 bytes or less.

7. The method of claim 1, further comprising:
defining the interval of time, thereby enabling the interval of time to be configurable.

8. The method of claim 1, further comprising:
communicating the appended data stream for remote analysis and archiving.

9. The method of claim 8, wherein:
the communicating comprises communicating via a wireless network.

10. The method of claim 8, wherein:
the communicating comprises communicating the appended data stream after a defined duration of time.

11. The method of claim 1, wherein:
the two states are on and off; and
the first character is a binary one, and the second character is a binary zero, thereby enabling a two-state event history to be established using only one bit per state per defined interval of time; and further comprising:
defining the interval of time, thereby enabling the interval of time to be configurable; and
communicating the appended data stream after a defined duration of time for remote analysis and archiving.

12. A computer program product for coding an event history, the product comprising:
a storage medium, readable by a processing circuit, storing instructions for execution by the processing circuit for implementing the method of claim 11.

13. The method of claim 1, wherein:
the receiving information relating to a real time state of an event comprises receiving information from a storage device subsequent to the information having been acquired in real time.

14. A computer program product for coding an event history, the product comprising:
a storage medium, readable by a processing circuit, storing instructions for execution by the processing circuit for implementing the method of claim 1.

15. A device for coding an event history, comprising:
a receiver configured for receiving information relating to a real time state of an event;
a logic device configured for determining, for a defined interval of time, whether the real time state of the event is in one of two states;
a processor configured for appending a data stream, in response to the event being in a first state, with a first character representative of the first state, and for appending the data stream, in response to the event being in a second different state, with a second character representative of the second state; and
a storage device configured for saving the appended data stream;
wherein the logic device and processor are configured to repeat the determining and appending for a next sequential defined interval of time.

16. The device of claim 15, wherein:
the two states are on and off; and
the first character is a binary one, and the second character is a binary zero, thereby enabling a two-state event history to be established using only one bit per state per defined interval of time; and further comprising:
an input device configured for enabling a user to define the interval of time; and a transmitter configured for communicating the appended data stream after a defined duration of time for remote analysis and archiving.

17. The device of claim 16, wherein:
the transmitter is configured for communicating via a wireless network.

* * * * *